United States Patent
Foedlmeier et al.

(10) Patent No.: US 6,782,491 B1
(45) Date of Patent: *Aug. 24, 2004

(54) DEVICE AND METHOD FOR SUPPLYING POWER TO COMPUTER PERIPHERAL EQUIPMENT USING THE BUS SYSTEM OF THE COMPUTER

(75) Inventors: Dieter Foedlmeier, Altdorf (DE); Thomas Langer, Munich (DE); Stefan Seidenberg, Munich (DE)

(73) Assignee: Infineon Technologies AG, Munich (DE)

( * ) Notice: Subject to any disclaimer, the term of this patent is extended or adjusted under 35 U.S.C. 154(b) by 369 days.

This patent is subject to a terminal disclaimer.

(21) Appl. No.: 09/807,302

(22) PCT Filed: Sep. 9, 2000

(86) PCT No.: PCT/DE00/03156
§ 371 (c)(1),
(2), (4) Date: Apr. 11, 2001

(87) PCT Pub. No.: WO01/20433
PCT Pub. Date: Mar. 22, 2001

(30) Foreign Application Priority Data

Sep. 14, 1999 (DE) .......................... 199 44 053

(51) Int. Cl.[7] ................................. G06F 11/00
(52) U.S. Cl. ............................. 714/37; 714/22
(58) Field of Search .................. 714/37, 38, 22, 714/15, 16, 47, 48, 44, 43, 41; 713/300, 310, 320; 709/238

(56) References Cited

U.S. PATENT DOCUMENTS

| | | | | |
|---|---|---|---|---|
| 5,151,907 A | * | 9/1992 | Robbins | 714/22 |
| 5,638,540 A | | 6/1997 | Aldous | |
| 5,669,002 A | * | 9/1997 | Buch | 710/200 |
| 5,675,813 A | * | 10/1997 | Holmdahl | 713/310 |
| 5,694,019 A | * | 12/1997 | Uchida et al. | 320/106 |
| 5,799,196 A | | 8/1998 | Flannery | |
| 5,884,086 A | * | 3/1999 | Amoni et al. | 713/300 |
| 6,011,323 A | * | 1/2000 | Camp | 307/64 |
| 6,069,850 A | * | 5/2000 | Capps et al. | 368/156 |
| 6,178,514 B1 | * | 1/2001 | Wood | 713/300 |
| 6,357,011 B2 | * | 3/2002 | Gilbert | 713/300 |

* cited by examiner

Primary Examiner—Nadeem Iqbal
(74) Attorney, Agent, or Firm—Domingue & Waddell, PLC

(57) ABSTRACT

Apparatus and method for the power supply of auxiliary implements of computers via the bus system of the computer, wherein an energy store is provided within the auxiliary implements, which is supporting the power supply of the auxiliary implement and which by means of a suitable charge circuit is connected to the power supply in the bus system of the computer.

5 Claims, 1 Drawing Sheet

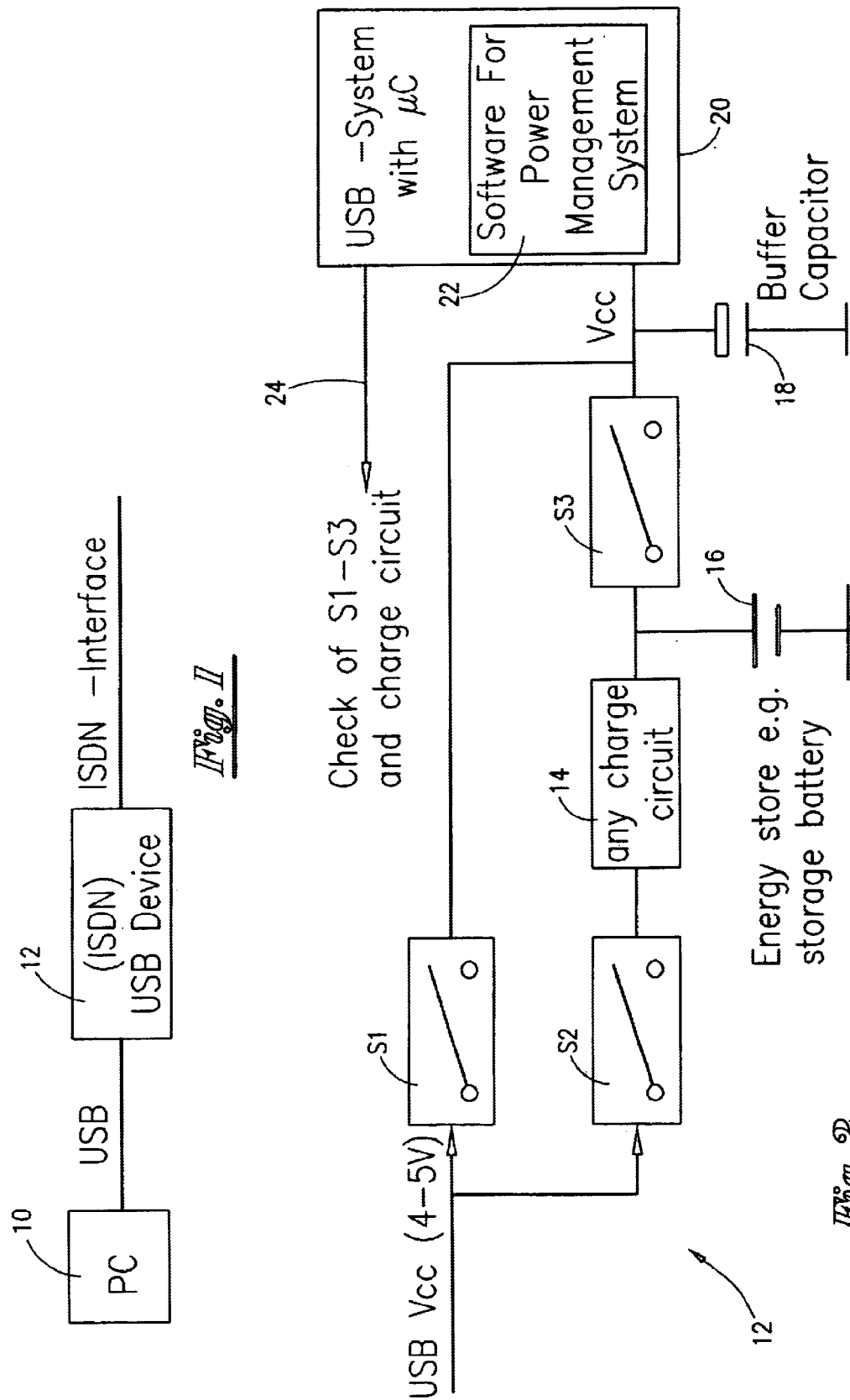

DEVICE AND METHOD FOR SUPPLYING POWER TO COMPUTER PERIPHERAL EQUIPMENT USING THE BUS SYSTEM OF THE COMPUTER

The present invention is related to an apparatus and a method for the power supply of auxiliary implements of computers via the bus system of the computer as well as to a method for intelligently starting the computer in case a certain call intended for the computer is received from an ISDN-system.

In modern computers, especially in personal computers and more especially in connection with laptop computers, the requirements with respect to a small as possible power consumption of the computers are becoming steadily more stringened. Due to this for the auxiliary implements of the computer (as well in internal form as cards as for external auxiliary implements, too) increasingly less energy from the bus of the computer is available since with the aim of energy saving the corresponding power packs of the computers increasingly are designed smaller.

Correspondingly the presently valid specifications and recommendations in the area of USB and PC (USB-Spec. 1.2, PC99) are containing very strict demands with regard to the maximal electric power input of auxiliary implements. For example a personal computer from the introduction of the ACPI (advance configuration and power interface) on, e.g. in the sleeping or stand-by mode (suspend mode), only is allowed to consume less than five watts. This has the consequence that an USB-auxiliary implement has to be powered from a separate power source (for example a plug-in power pack) when the power consumption of the implement becomes too high. The PC in this case is not available anymore as a power source. Plug-in power packs however are expensive, take room in the 230 volts multiple socket and the user has an additional cable on the auxiliary implement or the computer.

From the U.S. Pat. No. 5,638,540 an apparatus for the power supply of auxiliary implements of computers via the bus system of the computer already is known in which an energy store is provided in the auxiliary implement, which is supporting the power supply of the auxiliary implement and which by means of a suitable charge circuit is connected to the power supply in the bus system of the computer. In this known device for the power supply however the power supply of the computer constantly is loaded by the charging current.

Followingly it is the task to be solved by the present invention to make it possible to completely avoid the loading of the power supply of the computer by the charging current in cases when the power supply of the computer cannot provide for a sufficient output.

According to the invention this task is solved by the fact that a switching device is provided between the power supply in the bus system of the computer and the charge circuit.

In this connection, preferably the energy store is a storage battery.

Preferably the charge circuit simultaneously can contain a current limiting device for limiting the maximal current intensity drawn from the power supply of the bus system of the computer.

In this connection it is especially preferred to provide a further switching device between the energy store and the power supply of the auxiliary implement and an additional switching device for directly connecting the power supply in the bus system of the computer with the power supply of the auxiliary implement. The auxiliary implement both can directly powered from the power supply of the computer as well as exclusively from the energy store.

In this connection it is preferred that the control of the switching devices is done by a power management system in the auxiliary implement.

It is further preferred in this connection to provide the power supply of the auxiliary implement with a buffer capacitor. In this way voltage fluctuations during the switch-over of the switching devices are avoided.

Further, the task according to the invention is solved by a method for the power supply of auxiliary implements of computers via the bus system of the computer, in which energy is stored in the auxiliary implement, which is used for the buffering of high energy demands of the auxiliary implement and which at a low energy demand of the auxiliary implement or at a higher energy availability in the bus system is supplemented again by directly connecting the power supply of the auxiliary implement at a low energy demand of the auxiliary implement or at a higher energy availability in the bus system with the power supply in the bus system while the energy store simultaneously is connected to the power supply in the bus system and by separating the energy store from the power supply in the bus system at a high energy demand of the auxiliary implement or at a low energy availability in the bus system and by exclusively connecting the power supply of the auxiliary implement with the energy store.

The commands for such connection can be provided by a special micro controller software in the auxiliary implement. By this way an adaptation in the operational system of the computer can be dispensed with.

Further it is a task of the present invention to provide a method for starting a computer connected by an auxiliary implement and a bus system to an ISDN-system from a sleeping or resting mode into an active operational mode, wherein the action of starting the computer only should be triggered in case after a call arriving on the ISDN-system has been determined by the auxiliary implement that the call is actually meant for the particular computer by automatically following a D-channel protocol of ISDN.

According to the invention, this task is solved by the fact that in the auxiliary implement an energy store is positioned, which is supplying the energy for the processing of the D-channel protocol and which, in the sleeping or resting mode of the computer, is recharged from the bus system with a very small current.

In this connection it is especially preferred to recharge the energy store in the auxiliary implement during the active operational state of the computer with a stronger current from the bus system. In this way, constantly a good charging state of the energy store in the auxiliary implement can be ensured.

Further it is preferred to supply the auxiliary implement with current directly from the bus system during the active operational state of the computer. An unnecessary load of the energy store in the auxiliary implement thereby is avoided.

The present invention, in the following, is more detailedly described with reference to the exemplary embodiment shown in the enclosed drawings. In the drawings show:

FIG. 1 a block diagram of the power supply for an ISDN-interface as an auxiliary implement according to the invention; and FIG. 2 a detailed representation of the power supply of the auxiliary implement according to FIG. 1.

FIG. 1 is showing one embodiment of the present invention, in which a personal computer 10 is shown with an USB-interface. An ISDN-adapter 12 is connected to the USB-bus and the S-interface of the ISDN-network. Here the following conditions are given by the specification of the USB-bus:

In normal operation 100 mA can be used by each connected (low power) USB-implement as e.g. 12.

In the sleep or resting mode (suspend mode) at the maximum 0.5 mA can be used. Only the wake-up (=activation) of the personal computer allows again the use of 100 mA current.

The present invention solves the problem that these conditions have to be met by any auxiliary implement connected to the USB. Due to the extremely low admissible power consumption in the suspend mode, normally each auxiliary implement should have its own power pack. This, on the one hand, is very expensive and especially would not be worthwhile in cases when the power consumption of the auxiliary implement is exceeding the maximal allowable value only marginally.

Especially in the present case of an ISDN-interface by the specification of ISDN the further following conditions are given for this particular ISDN-interface: Contrary to an analog modem already at the moment of the call (before it "rings") it has to be determined whether the call makes sense for the final implement (whether a data transfer or a fax is announced via the service channel) or whether a different implement is addressed (e.g. the telephone). To this end, a processing of the D-channel protocol of the ISDN, i.e. of the service channel protocol, is necessary. If it is determined that the call is meant for the personal computer, a wake-up of the personal computer (intelligent wake-up) is necessary. To do so, for a short term, a current exceeding the 0.5 mA allowed in the suspend mode has to be drawn to enable the D-channel protocol on the USB-final implement 12 to evaluate the call and possibly wake-up the personal computer 10 and put the call on "hold" until the personal computer is active. According to the specifications, the personal computer needs five to ten seconds to switch-over from the suspend mode to the normal operational mode. Doing so, the power demand is substantially larger than the allowed 0.5 mA (see condition power consumption in the USB-specification).

The reaction of the D-channel protocol on the call has to have occurred after few seconds. The call would never be accepted if the personal computer firstly had to be booted (condition reaction time from the ISDN-specification). Further in some ISDN-multiple extension systems (PBX-systems) periodically once a minute the time is transmitted on the D-channel. This, too, necessitates a procession of the D-channel protocol. According to the USB-specification, however, current only is allowed to be drawn when the PC was awoken (=activated) (to possibly then after five seconds switch-off the PC again since the call was not for the PC). This, however, could lead to a periodical "PC-On-Off-On . . . "-sequence, which of course is not desirable.

Followingly, here the conditions of the ISDN-protocol are colliding with the conditions for a low power PC:

PC in the suspend mode at the maximum is allowed to consume five watt (specification PC99, ACPI-power management)

a booting of the PC at least needs five to ten seconds the ISDN-protocol stacks (D- and B-channel stacks completely) are running on the PC (low-cost solution for the ISDN-adapter 12), followingly the PC 10 is needed for the function of the USB-final implement 12.

The present invention solves this problem as shown in FIG. 2. FIG. 2 shows a detailed extract from the circuit of the auxiliary implement (USB-device) 12. Especially the connection between the power supply on the USB-bus (USBVCC) with the power supply of the USB-auxiliary implement (VCC) is shown.

Here the supply voltage on the USB-bus can be directly connected with the power supply VCC of the auxiliary implement 12 by a switching device S1. Further, the power supply on the USB-bus (USBVCC) is connected by a further switching device S2 and any charge circuit 14 with an energy store, e.g. an storage battery 16. The storage battery 16 again is connected with the power supply VCC of the auxiliary implement 12 by a further switching device S3. Additionally the power supply of the auxiliary implement 12 can be buffered by a buffer capacity, e.g. an electrolyt capacitor 18, to equalize voltage fluctuations when not exactly simultaneously switching the switches S1 and S3.

The remaining circuits in the auxiliary implement 12 here merely are shown as black box 20 containing the remaining circuits of the USB-final implement with the corresponding micro controller. As an additional box 22, the software for the power management system 22 according to the invention is shown running on the micro controller of the USB auxiliary implement 12.

By this software via the micro controller the charge circuit 14 and the switching devices S1 to S3 are controlled, too. This is represented by the arrow 24.

The inventive USB-final implement-power-management-system followingly is having the following constituents:

1. Special power-management-software in the USB-micro controller on the USB-auxiliary implement controlling the switching states of the switching devices S1 to S3 and 2. an electronic/mechanic circuit as shown in FIG. 2, which has to be mounted in the USB-auxiliary implement.

The special software is in this connection performing the following functions:

If the PC 10 is active (normal operation) and the USB-auxiliary implement 12 correspondingly is connected to the PC, the switches S1 and S2 are closed and the switch S3 is open.

In this state therefore, the storage battery is charged or the charge of the storage battery is maintained, the power supply of the auxiliary implement 12 directly occurs from the USB-bus via switch S1. This is no problem since in this operational state of the PC a power consumption up to 100 mA is admissible.

As soon as the PC is assuming the resting state (suspend), the switch S2 is opened to achieve that the USB-bus is not unnecessarily loaded with the charging or maintaining current of the storage battery. As long as the USB-auxiliary implement 12, too, is in the suspend state and is not needing additional energy, the switch S1 remains closed and the switch S3 remains opened. The suspend current of the remaining circuits of the auxiliary implement 12, namely, without problem can be limited to 0.5 mA, which means that the supply via the USB-bus still is admissible. The battery is disconnected from the power supply of the auxiliary implement 12 as well as from the bus to maintain the charge of the battery as long as possible.

As soon as the auxiliary implement 12 determines that it needs more current, for example because on the ISDN-D-channel an incoming call is signalized, the switch S3 is closed and the switch S1 is opened. Now the circuits 20 in the auxiliary implement 12 can deliberately draw current from the energy store 16 via the power supply VCC without being limited by the 0.5 mA-current limit of the PC-bus. By this power supply the auxiliary implement 12 can process the D-channel-protocol and can determine whether the call really is meant for the PC 10. In this case, the auxiliary implement 12 holds the call and "wakes-up", i.e. activates that PC 10.

When completely switching-off the PC 10 at least the switches S2 and S3 are opened, to assure that the energy store 16 not unnecessarily is loosing charge and the switch S1 can be opened or closed.

The corresponding operational stages of the power-management-system are shown clearly in the following table:

| Switches closed (remainder open) | States of PC | States of the Device | Explanation |
|---|---|---|---|
| 1,2 | PC active | USB-device plugged in | load/maintain storage battery, current from PC for final implement |
| 1 | suspend/active | suspend | 500 μA from PC. Battery disconnected from μC and USB |
| 3 | standby | intelligent wake-up | call arrives, battery supplies μC, USB is not loaded with more than 500 μA |
| (1) | switched-off | passive | battery disconnected from μC and USB |

According to the invention therefore, an auxiliary implement 12 for the USB-bus can be produced small, at low costs, consumer-friendly and fulfilling all specifications without having to be equipped as a "self-powered device" with clumsy plug-in power packs.

According to the invention, the auxiliary implement 12 instead of a plug-in power pack is having a self-contained energy store, for example a storage battery. This solution is especially useful when only small power amounts are necessary, for example in connection with applications in the field of telecommunication, e.g. ISDN, or in case only for a short time power is necessary.

According to the invention therefore by an energy store 16 "on-board" of the auxiliary implement 12 by tricky connecting the energy store to the system there is created a "pseudo-bus-powered-device", which more easily can be handled by the user and which with respect to the production technique can be manufactured less costly.

The USB-final-implement-power-management-system advantageously can be used in connection with all USB-final implements at the PC, which with respect to the maximal allowable current consumption are having difficulties to fulfill the preset conditions. The importance of the USB-final implements will be growing further due to the fact that in the future the former ISA and PCI-boards in the PC are planned to be substituted by the new USB-cards.

By means of the present invention it is possible to build an ISDN-controller having USB-standard with a single chip, wherein the implement will have the size of a match-box. Only by means of the present invention it is possible to perform an "intelligent wake-up" of the PC (i.e. the PC is booted in case a call arrives) without needing an external plug-in power pack since otherwise not enough current is available to process the corresponding ISDN-protocols.

What is claimed is:

1. Apparatus for the power supply of auxiliary implements of computers via the bus system of the computer, in which there is provided an energy store in the auxiliary implement supporting the power supply of the auxiliary implement and which by a suitable charge circuit is connected with the power supply in the bus system of the computer, comprising a first switching device between the power supply in the bus system of the computer and the charge circuit; a second switching device which is provided between the energy store and the power supply of the auxiliary implement with a third switching device being provided for directly connecting the power supply in the bus system of the computer with the power supply of the auxiliary implement.

2. Apparatus according to claim 1, wherein the control of the first, the second and the third switching devices is performed by a power-management-system in the auxiliary implement.

3. A method for starting a computer being connected by an auxiliary implement and a bus system with an ISDN-system from a sleeping or resting state into an active operational state, wherein the procedure of start-up of the computer is triggered if after a call arriving on the ISDN-system has been determined to actually be meant for the computer by independent processing of a D-channel protocol of ISDN, and wherein the method comprises providing the auxiliary implement with an energy store supplying the energy for the processing of the D-channel protocol and which in the sleeping or resting state of the computer is recharged from the bus system with the very low current.

4. A method according to claim 3, further comprising recharging the energy store in the auxiliary implement during the active operational state of the computer with a stronger current from the bus system.

5. A method according to claim 3, further comprising directly supply the auxiliary implement with current from the bus system during the active operational state of the computer.

* * * * *

UNITED STATES PATENT AND TRADEMARK OFFICE
CERTIFICATE OF CORRECTION

PATENT NO. : 6,782,491 B1
DATED : August 24, 2004
INVENTOR(S) : Foedlmeier et al.

It is certified that error appears in the above-identified patent and that said Letters Patent is hereby corrected as shown below:

Title page,
Item [*] Notice, please delete "This patent is subject to a terminal disclaimer."

Signed and Sealed this

Fifth Day of April, 2005

JON W. DUDAS
*Director of the United States Patent and Trademark Office*